Oct. 24, 1967  R. L. TRIPLETT  3,349,355
D'ARSONVAL TYPE ELECTRICAL INSTRUMENT HAVING MEANS FOR
ADJUSTING THE DEFLECTIONAL CHARACTERISTICS IN SELECTED
REGIONS ALONG THE SCALE OF THE INSTRUMENT
Filed June 17, 1965
2 Sheets-Sheet 1
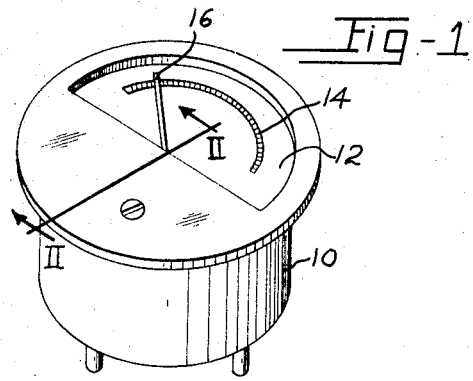
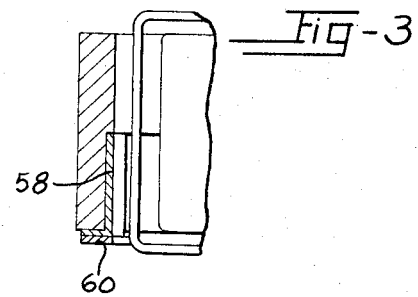
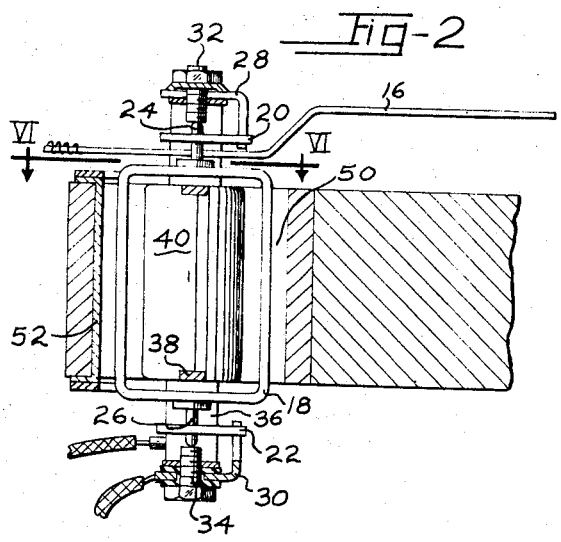
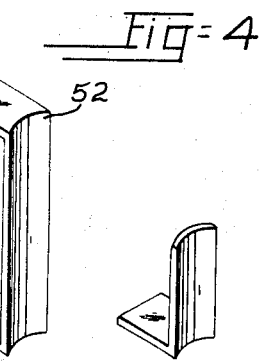
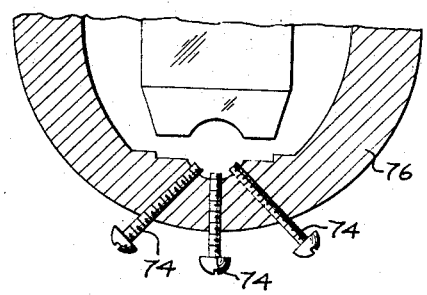
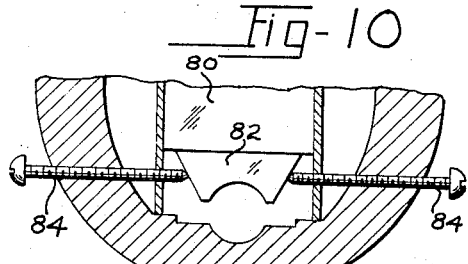
INVENTOR
RAY LEON TRIPLETT
BY
M. A. Cooly Oct. 24, 1967    R. L. TRIPLETT    3,349,355
D'ARSONVAL TYPE ELECTRICAL INSTRUMENT HAVING MEANS FOR
ADJUSTING THE DEFLECTIONAL CHARACTERISTICS IN SELECTED
REGIONS ALONG THE SCALE OF THE INSTRUMENT
Filed June 17, 1965    2 Sheets-Sheet 2

INVENTOR
RAY LEON TRIPLETT
BY
M. A. Crosley

United States Patent Office 3,349,355
Patented Oct. 24, 1967

3,349,355
D'ARSONVAL TYPE ELECTRICAL INSTRUMENT HAVING MEANS FOR ADJUSTING THE DEFLECTIONAL CHARACTERISTICS IN SELECTED REGIONS ALONG THE SCALE OF THE INSTRUMENT
Ray L. Triplett, Largo, Fla., assignor to The Triplett Electrical Instrument Co., Bluffton, Ohio
Filed June 17, 1965, Ser. No. 464,672
5 Claims. (Cl. 335—222)

This invention relates to electrical instruments and is particularly concerned with instruments of the D'Arsonval type.

More particularly still, the present invention relates to an arrangement for adjusting the flux distribution in the air gap of an electrical indicating instrument of the D'Arsonval type.

Electrical instruments of the D'Arsonval type referred to above are constructed so as to have a wound bobbin mounted for movement in an air gap formed in a permanent magnet frame. The bobbin is biased for a predetermined zero position by biasing springs and will move in the magnetic field when a current flows through the winding on the bobbin. Obviously, the amount of deflection of the bobbin in the air gap is proportional to the flux density within the air gap and variations in the flux density will influence the accuracy of the deflection of the bobbin. For indicating the amount of deflection of the bobbin in the air gap, a needle is connected to the bobbin and swings over a graduated scale.

In commercial instruments, a 2% accuracy is permissible which represents 2% of full scale deflection at any instrument reading. More accurate instruments will have a 1% accuracy or even better. In any case, even the closest accuracy can be maintained only by resorting to costly hand-drawn, or photo-processed scales on the dial over which the needle sweeps. It is not possible with an instrument manufactured with commercial manufacturing tolerances to pre-print scales and still maintain a high degree of accuracy of indication of the instrument.

Having the foregoing in mind, it is a primary object of the present invention to provide an arrangement whereby the deflection of the wound bobbin in the air gap of a D'Arsonval type indicating electrical instrument can be so controlled as to produce highly accurate readings.

Another object of this invention is the provision of a method and apparatus for adjusting the air gap flux density in selected regions within the air gap of the magnetic frame of an indicating electrical instrument so as to produce predetectable deflections of the movable element of the instrument movement thereby to permit the use of pre-printed scales while at the same time producing highly accurate indications by the instrument.

A particular object of this invention is the provision of a method and apparatus for balancing the air gap flux density in an electrical instrument which can easily be applied to the instrument at the time of assembly thereof.

A still further object of this invention is the provision of a method and apparatus for adjusting the imperfections in the flux distribution in the air gap of an electrical instrument and for correcting the imperfections in the meter movement to produce linearity in scale tracking by the instrument needle.

A still further object is the provision of a method and apparatus such as referred to above which is quite inexpensive to incorporate in an instrument.

These and other objects and advantages of this invention will become more apparent upon reference to the following specification taken in connection with the accompanying drawings, in which:

FIGURE 1 is a perspective view showing a typical instrument of the type adapted for the practice of the present invention;

FIGURE 2 is a somewhat schematic vertical sectional view through the instrument as indicated by line II—II on FIGURE 1 but with the instrument case and other superfluous parts eliminated;

FIGURE 3 is a fragmentary sectional view similar to FIGURE 2 but showing a modification;

FIGURES 4 and 5 are perspective views showing full length and half length density modifying elements of the type with which the present invention is concerned;

FIGURE 9 is a fragmentary sectional view showing a modified arrangement for adjusting the distribution of flux in the air gap, and FIGURE 10 is a view like FIGURE 9 but shows still another modification of the present invention.

Figure 6:
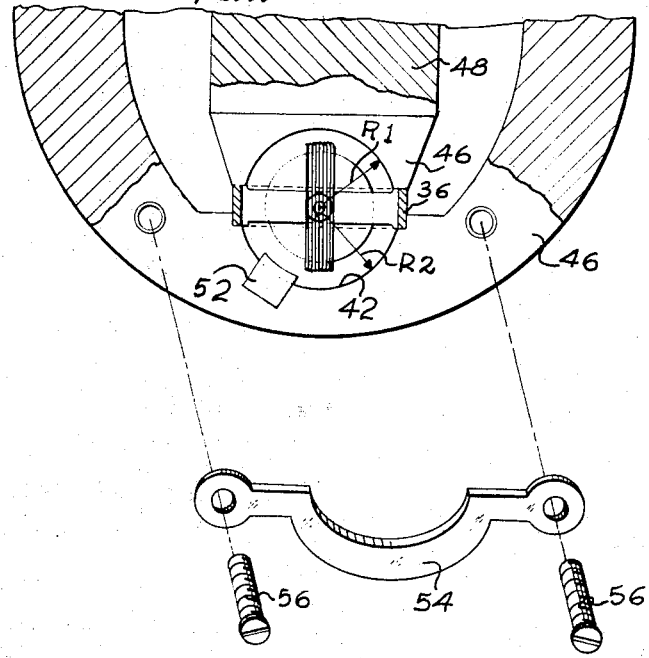
FIGURE 6 is a sectional view indicated by line VI—VI on FIGURE 2 showing more in detail the construction of an instrument according to the present invention.

Referring to the drawings somewhat more in detail, the instrument indicated in FIGURE 1 comprises a case 10 in which is a dial 12 having graduations 14 and over which an instrument pointer 16 sweeps.

Pointer 16 is connected to a bobbin 18 as shown in FIGURE 2. Bobbin 18 is wound with wire coil and the ends of the coil thereon are connected to the biasing springs 20 and 22 which are connected to the bobbin support shafts 24 and 26 at the inner ends of the springs, while the outer ends of the springs are connected to the anchors 28 and 30, at least the upper one of which is angularly adjustable so as to serve as a zero adjustment for the instrument.

The screws 32 and 34 which receive the ends of shafts 24 and 26 are carried in a frame 36 forming a part of the instrument movement. This frame has cross bars 38 that support a cylindrical core 40 which is soft iron and which forms the inner wall of the air gap in which bobbin 18 rotates.

As will be seen in FIGURE 6, the outer wall of the air gap is formed on one side by the arcuate face 42 of soft iron magnet ring 44, while on the opposite side of the core, a pole piece 46 has a similar arcuate face and is mounted on the end of permanent magnet 48, the opposite end of which engages the inside of magnet ring 44 on the side thereof opposite arcuate face 42.

FIGURE 6 will also show that frame 36 is fitted between pole piece 46 and ledges formed therefore on the inside of magnet ring 44.

Permanent magnet 48 has one pole abutting the inside of ring 44 at the top while the other pole of magnet 48 has pole piece 46 thereon. This arrangement will produce a strong magnetic field between the opposed arcuate faces 42 of ring 44 and the arcuate face of pole piece 46. The core 40 is coaxial with the center of curvature of the pole faces so the magnetic field is substantially radial in the air gap 50. The sides of bobbin 18 are disposed in the air gap so that when a current flows in the coil on the bobbin, a motor effect is created which will cause the bobbin to deflect against the bias of springs 20 and 22. The amount of deflection of the bobbin for any given current value depends upon the strength of the magnetic field. Due to manufacturing tolerances and variations in materials, it is seldom the case that the distribution of flux in the air gap is absolutely uniform or that the bobbin will deflect exactly the same amount for each increment of current supplied thereto. The flux distribution in the air gap is the only factor influencing bobbin deflection that is readily adjustable and the present invention takes this into account in arriving at an instrument movement wherein high accuracy is possible with pre-printed scales.

According to the present invention, the distribution of flux density in the air gap referred to, the air gap being designated by reference numeral 50, is varied by introducing into the air gap a vane 52 which is of soft iron and which is shaped to fit against the adjacent outer wall of the air gap. A full length vane 52 prior to being placed in the air gap is shown in FIGURE 4. A vane of this nature may be variable in thickness, a thickness of .008 inch being contemplated. In order to provide space for the vane 52, that one of arcuate surface 42 and the curved pole surface on which vane 52 is to rest is cut away about .010 inch. Thus, as will be seen in FIGURE 6, R2 pertaining to arcuate face 42 is about .010 inch greater than R1 pertaining to the curved face of pole piece 46. Inasmuch as the pertaining face is cut off over its entire circumferential area, this in itself does not disturb the flux in the air gap. It will merely increase the air gap slightly. When vane 52 is put in place, however, it can be adjusted circumferentially in the air gap on its pertaining pole face, and thus effect the desired distribution of flux density in the air gap to provide for substantial linearity of scale characteristics. Specifically, in the circumferential region where the vane is located, the flux density in the air gap is increased so that when the side of the bobbin is disposed in that region, the motor effect exerted thereon is increased and greater deflection of the instrument pointer will be had.

It will be understood, of course, that two or more vanes could be provided within the air gap, and they could be of variable width if desired to effect fine adjustment of the distribution of the flux density.

There are preferably provided clamp members 54 at the top and bottom of magnet ring 44 which are held in place by screws 56, and which serve to clamp the vanes in place once they have been adjusted to the desired position. While two clamps are illustrated, one will many times serve the purpose.

As will be seen in FIGURE 3, instead of providing for full length vanes, a vane 58 extending only a fractional part of the axial length of the air gap could be employed and clamped in place by clamp member 60. In this case, only that axial length of the air gap which is to receive a vane will be cut out for receiving the vane.

Figure 7:
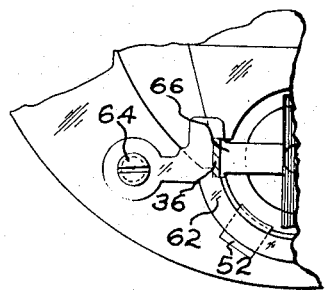
FIGURE 7 is a fragmentary plan view showing a modification in which the clamp for clamping the flux density modifying element also serves for clamping a portion of the instrument movement in place.

As will be seen in FIGURE 7, a clamp member 62 held in place on the magnet ring by screw means 64 could be provided, and which not only clamps the vane 52 in place but which clamp member is also provided with notch means 66 adapted for closely receiving the bobbin frame 36 whereby one and the same clamp member can be employed for holding the bobbin frame in place while simultaneously serving to clamp the flux density controlling vane or vanes in place.

Figure 8:
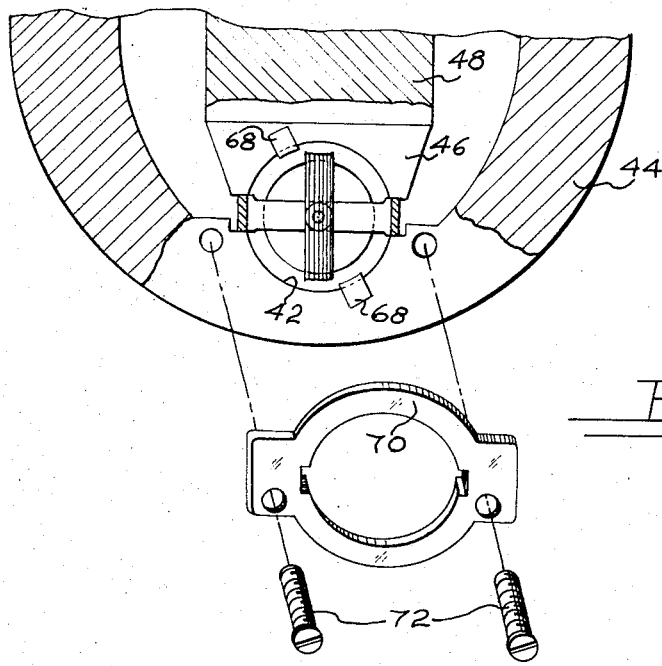
FIGURE 8 is a view similar to FIGURE 6 but shows how two or more of the flux density modifying elements could be employed together with a single clamp for holding both thereof.

As will be seen in FIGURE 8, the face of pole piece 46 as well as curved surface 42 of magnet ring 44 could be cut away about .010 inch beyond their usual size, and vanes 68 could be provided on opposite sides of core 40. In this case, the vanes are clamped in place by a ring like clamp member 70 held in place on the magnet ring by screws 72. Fine adjustment of the flux distribution can be effected by providing two or more vanes as disclosed in FIGURE 8, each vane, of course, being capable of independent adjustment.

The variation of the distribution of the flux density can also be accomplished as shown in FIGURE 9 by the provision of screws of magnetic material as indicated at 74 in FIGURE 9. These screws, which can be substantially flush with magnet ring 76 on the outside can be turned to effect slight adjustment in the distribution of the magnetic flux density in the air gap around the core (not shown in FIGURE 9).

As noted in FIGURE 10, the permanent magnet 80 of the magnetic frame could be provided with a movable soft iron pole piece 82, and this pole piece could be laterally adjusted by the screws 84 extending through the magnet ring. These screws also could terminate substantially flush with the magnetic ring on the outside. By adjustment of the screws, the pole piece can be moved to eccentric positions relative to the core (not shown in FIGURE 10), and in this manner distribution of the flux density can be varied.

The arrangement of the present invention permits the use of linear scales, thereby permitting easy changes of scales during servicing or for modification in the field. Movements can be made in advance, thus saving production cost by permitting larger production runs to be made. Metal dials with printed scales can be employed and dials having multiple scales thereon with an accuracy comparable to hand-drawn or photo-processed scales can be provided but at a much lower cost than such scales. Furthermore, a standard scale could be provided to fit on movements designed for that particular scale, and substantially identical accuracy could be built into all the instruments.

It will be understood that this invention is susceptible to modification in order to adapt it to different usages and conditions; and accordingly, it is desired to comprehend such modifications within this invention as may fall within the scope of the appended claims.

What is claimed is:

1. In combination; an electrical instrument of the D'Arsonval type having a permanent magnet frame with at least one arcuate pole face and a cylindrical core, said core and pole face being concentric, said core and pole face forming an arcuate air gap therebetween having a substantially radial field therein, a wound bobbin pivotally mounted in said instrument having at least one leg in said air gap and rotatable on its pivotal support as said leg moves in said air gap in the circumferential direction thereof, an indicator fixed to the bobbin so as to move therewith, a preprinted scale having graduations thereon over which the indicator of the instrument sweeps, the improvement comprising at least one magnetically permeable element adjustably disposed in said air gap adjacent said pole face which is relatively short in the circumferential direction of the air gap and operable to increase the flux density in the air gap in the circumferential range thereof in which said element is disposed, and means for clamping said element in adjusted circumferential position in said air gap, said magnetic frame having opposed sides and a pair of arcuately shaped pole faces joining said opposed sides and perpendicular thereto, said air gap being generally annular in shape and being substantially defined at its outer perimeter by said pole faces and at its inner periphery by the outer surface of said core and said permeable means comprising thin iron vane means extending at least partially along the axial length of one of said pole faces between the pertaining opposed sides thereof, at least one end of said vane means being bent over one of said sides, and clamp means adjustably securing said one end of said vane means to the said one of said opposed side.

2. The combination as claimed in claim 1 in which said iron vane means is generally C-shaped in cross section and extends across the full axial length of said one pole face and has both ends thereof bent over to engage the pertaining opposed sides of the said magnetic frame of the pertaining pole face, said clamp means having an arcuate portion between the ends thereof, said arcuate portion being adapted to engage one of the said ends of said vane means and adjustably maintain the vane means in position on said one face, said arcuate portion being substantially concentric with said air gap.

3. The combination as claimed in claim 1 in which said one pole face along at least that axial portion thereof in which said vane means is disposed is formed to a radius which is greater than the radius of the other pole face by an amount at least equal to the thickness of said vane means.

4. In combination; an electrical instrument of the D'Arsonval type having a magnetic frame, said magnet frame comprising a permanent magnet having opposed sides and an arcuately shaped pole face joining said sides at one end of said magnet and perpendicular to said sides, a magnetic ring having opposed sides, said ring engaging the other end of said magnet on the inside of the ring at one end of a diameter of the ring, an arcuately shaped recess on the inner periphery of the ring at the other end of said diameter joining said opposed sides and perpendicular thereto and forming a second pole face concentric with said magnet pole face, a cylindrical core between said pole faces concentric therewith, frame means positioned between said one end of said magnet and the inside of the ring opposed thereto for providing support for said core, a wound bobbin having a leg extending axially in the air gap between said core and each said pole face, said bobbin being rotatably mounted in said frame, bias spring means biasing said bobbin toward a predetermined rotated position in said frame, and thin magnetic vane means extending axially along at least one of said pole faces, closely adjacent thereto and operable to increase the flux density in the circumferential range of the air gap in which the vane means is located, and means for clamping said vane means in circumferentially adjusted positions in said air gap, said vane means being thin and including a bent over portion adapted to rest on one of said opposed sides of said magnet frame, said means for clamping said vane means comprising a generally ring-shaped member having a periphery adapted to engage one of the opposed sides of said magnet and the pertaining one of said opposed sides of said ring, and means for securing said ring-shaped member to said magnet frame and thereby maintain said vane means in position in the magnet frame.

5. The combination as claimed in claim 4 in which said ring-shaped member has notches on opposed sides thereof receiving said frame means supporting said cylindrical core and said bobbin.

References Cited

UNITED STATES PATENTS

| 2,175,046 | 10/1939 | Warner | 324—132 X |
| 2,537,221 | 1/1951 | Hickok | 324—151 X |
| 2,730,009 | 1/1956 | Poirette | 324—151 X |

FOREIGN PATENTS 58,450   10/1946   Netherlands.

BERNARD A. GILHEANY, *Primary Examiner.*

H. A. LEWITTER, *Assistant Examiner.*